No. 666,088. Patented Jan. 15, 1901.
H. DEITZ.
BICYCLE PACKAGE CARRIER.
(Application filed Mar. 17, 1899.)
(No Model.)

Witnesses
Inventor
Henry Deitz.
By his Attorney

THE NORRIS PETERS CO., PHOTO-LITHO., WASHINGTON, D. C.

UNITED STATES PATENT OFFICE.

HENRY DEITZ, OF DENVER, COLORADO, ASSIGNOR TO THE DEITZ MANUFACTURING COMPANY, OF SAME PLACE.

BICYCLE PACKAGE-CARRIER.

SPECIFICATION forming part of Letters Patent No. 666,088, dated January 15, 1901.

Application filed March 17, 1899. Serial No. 709,419. (No model.)

*To all whom it may concern:*

Be it known that I, HENRY DEITZ, a citizen of the United States of America, residing at Denver, in the county of Arapahoe and State of Colorado, have invented certain new and useful Improvements in Bicycle Package-Carriers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in package-carriers for bicycles; and it consists of the features herein described and claimed, all of which will be fully understood by reference to the accompanying drawings, in which is illustrated an embodiment thereof.

Figure 1:
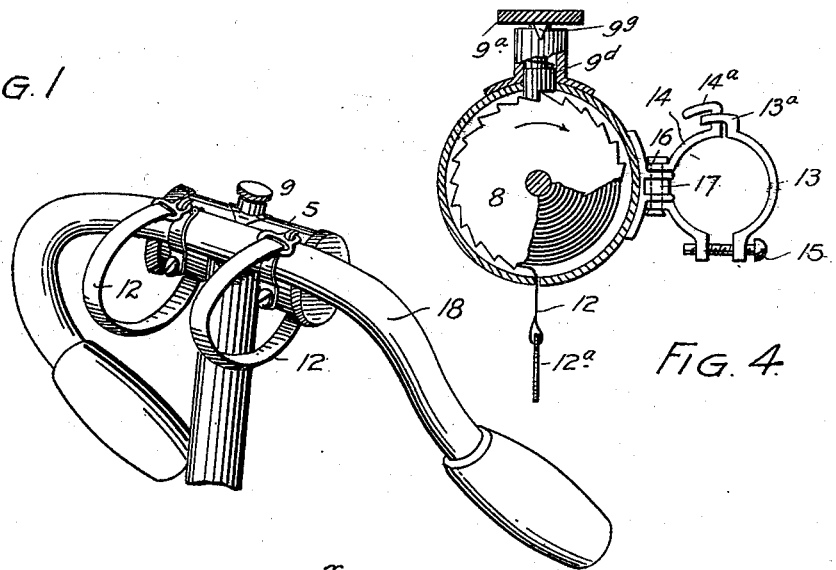
Figure 4:
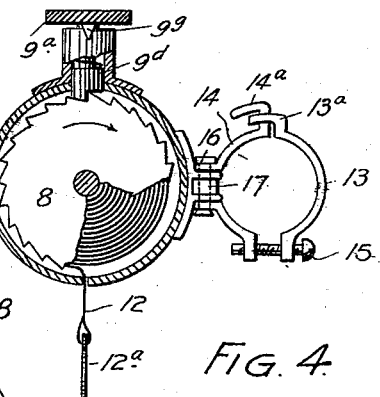
Figure 2:
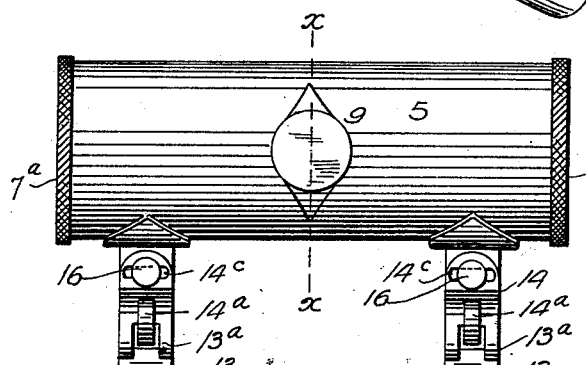
Figure 3:
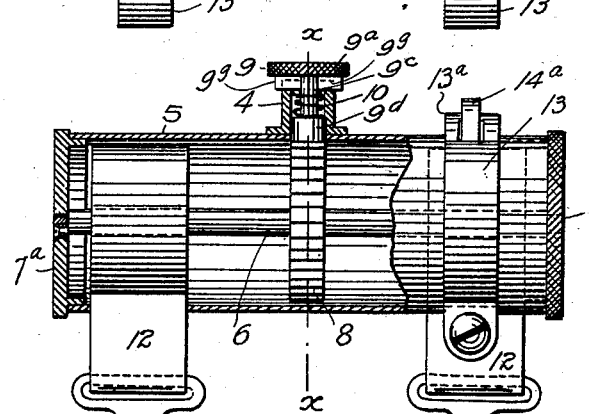

In the drawings, Figure 1 is a perspective view of my improved package-carrier applied to the bicycle handle-bar. Fig. 2 is a top view of the device shown in detail. Fig. 3 illustrates the device partly in section and partly in elevation. Fig. 4 is a cross-section taken on the line $x\ x$, Figs. 2 and 3.

Similar reference characters indicating corresponding parts in the views, let the numeral 5 designate a cylindrical casing whose extremities are closed by two heads 7 and $7^a$, which are respectivly attached to the extremities of a spindle 6, passing through the longitudinal center of the casing. The heads are loose upon the casing and adapted to turn freely with the spindle. Upon the center of this spindle is mounted and made fast a ratchet disk or wheel 8, whose toothed periphery is engaged by a dog 9, arranged to pass through an opening formed in the casing and surrounded by a collar 4, made fast to the casing. The inner extremity of this dog is provided with a tooth $9^d$, beveled on one side and straight on the other, whereby when in engagement with the ratchet-wheel the latter may turn in one direction, while it is locked from turning in the other direction. The position of the dog may, however, be such as to permit the turning of the ratchet in either direction when the tooth of the dog is in engagement with the teeth of the ratchet, as hereinafter explained. Above the tooth $9^d$ the dog is reduced in size, forming a stem $9^c$, which passes through an opening in the top of the collar, which is provided with an interior flange surrounding the opening, in which the stem fits nicely. This stem is surrounded by a coil-spring 10, located between the tooth of the dog and the interior flange of the collar. The outer extremity of the stem $9^c$ is provided with a milled head $9^a$, having two teeth $9^g$ formed on its under side and adapted, when properly adjusted, to enter counterpart notches formed in the top of the collar, in which position it is securely retained by the coil-spring. When these teeth $9^g$ are in engagement with the notches of the collar, the inner extremity of the dog engages the teeth of the ratchet-wheel. When it is desired to disengage the dog from the ratchet, the dog is raised sufficiently to lift the teeth $9^g$ out of these notches, after which the dog is turned and the teeth $9^g$ allowed to rest upon the top of the collar. The dog will then remain in this position, and the spindle and its attachments may be turned at will. To this spindle are attached, on opposite sides of the ratchet-disk, two pieces of tape 12, forming straps which pass through slots in the casing, their outer extremities being provided with eyes $12^a$.

The casing 5 is secured to the handle-bar by means of clamps composed of two parts 13 and 14. The part 14 is connected with the casing by means of a hinge-pin 16, which passes through apertured lugs formed on the casing and clamp member, respectively, whereby the clamp member is allowed to turn freely on the pin. A piece of rubber or other suitable or similar material 17 is inserted between the lugs of the casing and allowed to bear against the handle-bar of the bicycle when the clamp is applied to prevent the parts from rattling. The lugs of the clamp are provided with slots $14^c$, extending at right angles to the axis of the hinge-pin and parallel with the axis of the casing 5, whereby the clamp member 14 is permitted two adjustments, one on the hinge-pin 16 as an axis and another on an axis extending at right angles to the hinge-pin axis. The clamp member 14 is provided with a hook $14^a$, which engages a slotted lug $13^a$, formed on the clamp member 13. The clamp members are further connected below the handle-bar by a screw 15, which passes through lugs formed on the two clamp members. By virtue of the clamp adjustments heretofore described the package-carrier may be secured to any-shaped handle-bar regardless of the extent or direction of its curve.

In applying the device to the handle-bar the casing is preferably located in the rear of the bar and the two clamps passed around the bar on opposite sides of the depending stem. Assuming that the tapes are wound up around the spindle, the dog 9 is lifted to disengage its inner extremity from the ratchet 8. The dog is then turned to bring the teeth $9^g$ out of line with the counterpart notches in the collar. The dog will then remain in this position and the tape straps may be unwound at will by pulling on their outer extremities, since the spindle 6 and its attachments are allowed to turn freely. The straps are then placed around the package and their extremities attached to the hooks $14^a$ of the clamps. The dog 9 is then readjusted to allow its tooth to engage the ratchet-wheel, as shown in Fig. 4. Then by turning the heads 7 and $7^a$ in the direction indicated by the arrow in Fig. 4 the tapes or straps may be tightened on the package at will, but cannot be turned in the reverse direction. By giving the dog a half-turn from the position shown in Fig. 4, when the teeth will again engage the notches, the dog will be in such a position that while engaging the ratchet the latter may be turned in either direction, since the beveled face of the dog will be turned toward the straight face of the ratchet-tooth.

Having thus described my invention, what I claim is—

1. In a package-carrier, the combination of a cylindrical casing, a spindle passing through heads fast thereon and adapted to close the casing extremities, upon which they are allowed to turn freely, straps having one extremity of each attached to the spindle within the casing, which is slotted to allow the straps to be drawn through, a ratchet-disk attached to the spindle and inclosed by the casing, a collar surrounding an opening formed in the casing opposite the ratchet-disk, and a spring-held dog passing through said collar and adapted to engage the disk, the outer extremity of the dog being provided with a head having teeth adapted to engage notches formed in the collar, the arrangement being such that when the teeth are raised from the notches and the dog turned to allow the teeth to rest on the upper edge of the clamp the dog is held out of engagement with the ratchet-disk.

2. In a package-carrier, the combination with a casing, a spindle passing therethrough, heads attached to the spindle extremities and revoluble on the casing, and a ratchet-disk fast on the spindle and inclosed by the casing, of a spring-held locking-dog passing through an opening formed in the casing, a collar surrounding said opening and having a notch or recess formed in its upper edge, the dog having a head provided with a tooth adapted to engage the notch in the collar, the dog being arranged to turn in the collar for the purpose set forth.

3. The combination with a casing, a revoluble spindle, heads attached to the spindle and closing the ends of the casing, straps attached to the spindle and passing through slots formed in the casing, and a ratchet-disk fast on the spindle and inclosed by the casing, of means mounted on the casing for controlling the rotation of the spindle, comprising a collar surrounding an opening formed in the casing opposite the edge of the ratchet-disk, a spring-held dog arranged to engage the ratchet-disk and turn in said collar, and suitable means for holding the said dog out of engagement with the disk.

4. The combination with a casing having revoluble heads, a spindle attached to said heads, a ratchet-disk fast on the spindle, and straps attached to the spindle and passing through slots formed in the casing, of a spring-held dog for controlling the movement of the spindle, said dog passing through an opening formed in the casing and having a tooth adapted to engage the ratchet-disk, said tooth being beveled on one side and straight on the other, whereby, when the bevel of the dog's tooth fits or corresponds as to position with the bevel or incline of the ratchet-teeth, the spindle and ratchet may be turned in one direction, but are locked from turning in the opposite direction.

5. In a package-carrier, the combination with a casing having a winding-spindle, and a ratchet-disk fast on the spindle, of a spring-held dog adapted to engage the disk, an opening formed in the casing, the inner extremity of the dog being beveled on one side and straight on the other, the dog being mounted on the casing in such a manner as to have both an endwise and a turning movement.

6. The combination of a casing, a spindle passing axially therethrough, heads forming the ends of the casing and fast on the spindle extremities, the heads and spindle being arranged to turn in the casing, a ratchet-disk fast on the spindle intermediate the two heads, a dog mounted on the casing and passing through an opening therein to engagement with the ratchet-wheel, the dog being arranged to lock the disk and its connections against rotation in one direction, while it prevents movement in the opposite direction, and straps attached to the spindle and passing through slots formed in the casing which conceals the straps when the latter are wound around the spindle.

In testimony whereof I affix my signature in presence of two witnesses.

HENRY DEITZ.

Witnesses:
A. J. O'BRIEN,
NELLIE G. DANIELS.